July 19, 1955 H. M. FLEMING, JR 2,713,676

MAGNETIC RECORDING SYSTEMS

Filed Aug. 30, 1951

INVENTOR
HOWARD M. FLEMING, JR.
BY William [signature]
AGENT 2,713,676

United States Patent Office 2,713,676
Patented July 19, 1955

2,713,676

MAGNETIC RECORDING SYSTEMS

Howard M. Fleming, Jr., Orange, N. J., assignor to Monroe Calculating Machine Company, Orange, N. J., a corporation of Delaware Application August 30, 1951, Serial No. 244,367
1 Claim. (Cl. 340—174)

This invention relates to magnetic recording and more particularly to improved magnetic recording arrangements for use in electronic computers or the like.

In general, electronic computers utilize magnetic recording as a storage medium for information that is to be saved for future use, the information being transposed into discrete, magnetized code spots on a magnetic tape, drum, or disc. Magnetic tape of the type involved is well known, and disclosures of a magnetic drum and a magnetic disc are found in the patent to Cohen et al. #2,540,654 and in the co-pending application of William H. Burkhart, Serial No. 228,148. In these magnetic storage arrangements, particularly those utilizing a drum or a disc, it is desirable that recording of information and picking up or playing back of other information be conducted simultaneously. This usually is done by providing separate recording and playback heads which are spaced apart along the recording track of the drum or disc.

In practice, it has been found that a recording head, when operated to magnetize a spot of the associated magnetic track, radiates a field of flux which links the playback head along with the field associated with the magnetic spot being sensed at the time. Obviously, this effects substantial distortion, if not complete nullification, of the signal voltage generated in the coil of the playback head in response to the scanning of said magnetic spot. Futher, in those instances wherein the playback head is scanning a blank area of the recording track containing no magnetized spot, a false voltage signal is generated in its coil due to said radiated flux field. It will readily be seen that these conditions are extremely detrimental to the accurate functioning of the computer.

While the above discussion is limited to spot magnetizing arrangements, the described radiated interference problem also arises in those magnetic recording systems of the continuous or audio type wherein recording and playing back occur simultaneously.

The principal object of the invention, therefore, is the provision of means for substantially eliminating the undesired effects on a magnetic playback head of a flux field radiated by a simultaneously functioning recording head, without affecting the ability of the playback head to generate a maximum signal in response to the scanning of a magnetized medium.

According to one form of the invention, two playback heads are provided, one aligned with the recording channel to be scanned, and the other offset laterally a short distance. The coils of the heads are wound in series but in opposite directions so that potentials generated in both tend to cancel each other. The two playback heads are located relative to the record head in such manner that each links substantially the same pattern of the flux field radiated from said record head. In a specific instance of the invention, the two playback heads are associated with a drum and are positioned side by side diametrically opposite the record head.

In operation, the two playback heads link substantially equal numbers of radiated flux lines and generate substantially equal amounts of voltage. However, said voltages are opposed and cancel each other. If the playback head aligned with the recording channel, however, cuts the flux field of a magnetized spot or the like, a voltage which is not affected by the radiated interference is generated.

According to another form of the invention, a single playback head is provided, but the playback amplifier is variably biased by a voltage which is obtained from the record amplifier and corrected in phase so as to oppose the effect of a radiated flux field. In one embodiment of this form of the invention a potentiometer is connected in series with the output of the record amplifier and has its adjustable tap connected to an adjustable phase shift network whose output is used to variably bias the playback amplifier.

In operation, the potentiometer and the phase shift network are adjusted so that the bias applied to the playback amplifier is just sufficient to overcome the effect of radiated flux cut by the playback head. Thus, the playback amplifier amplifies only the information signal generated by the associated playback head.

Other objects and features of the invention will become apparent from the following description when read in the light of the drawings of which Fig. 1 is a partial diagrammatic perspective view illustrating the arrangement of a record head and a pair of playback heads in association with a magnetic disc.

Figure 1:
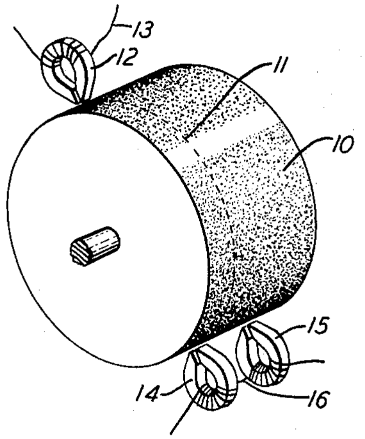
Figure 2:
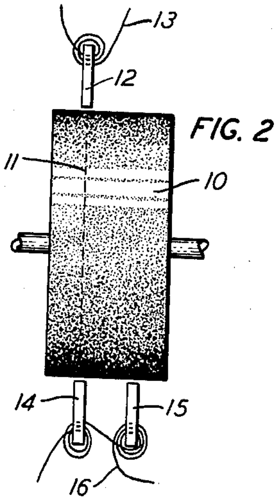
Fig. 2 is an edge view illustrating the manner in which the playback heads are offset laterally.

Referring to Fig. 1 there is illustrated a magnetic disc 10 which may be of the sort disclosed in the co-pending application to William Burkhart #228,148 and which has on its periphery a magnetic coating adapted to spot magnetization. Associated with the magnetic track of disc 10 which is indicated at 11 is a recording head 12 having a winding 13 which, when energized, generates sufficient flux to magnetize that area of said track immediately adjacent the gap in the head at the time. Diametrically opposed to the record head 12 is a playback head 14 from which a second playback head 15 is offset laterally a short distance. The common winding 16 is utilized by both playback heads but is wound in opposite directions on each, that is, it is wound in one direction on head 14 and in the other direction on head 15. Thus, equal numbers of flux lines cut by both heads effect the generation of equal but opposing voltages which cancel each other.

It is to be mentioned that playback heads 14 and 15 are to be located as close together as possible in order that both cut identical radiated flux field patterns. Care must be exercised however to insure that playback head 15 is not affected by the magnetic spots in track 11.

Preferably playback heads 14 and 15 are provided with a common shield having a single opening through which flux lines can pass, this arrangement further assuring that both heads cut identical radiated flux field patterns.

Figure 3:
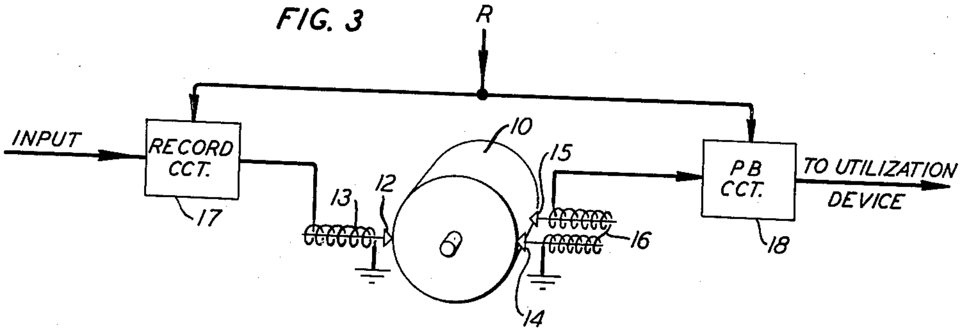
Fig. 3 is a schematic circuit diagram illustrating the circuit of the invention and Fig. 4 is a schematic wiring diagram illustrating a modified form of the invention.

A simple circuit for the recording and playback heads is shown in Fig. 3 and includes a record circuit 17 which drives the coil 13 for record head 12 and a playback circuit 18 which is driven by the output of coil 16 of the playback heads 14 and 15. Record circuits 17 and 18 function simultaneously under control of some clock mechanism or the like and for purposes of illustration, both are shown as being controlled by a common source of pulses R which is synchronized with disc 10. The device operates as follows:

On the occurrence of an input signal to record circuit 17 and the coincident occurrence of an R pulse, record circuit 17 energizes record coil 13, and playback circuit 18 is enabled for control by playback coil 16. On energization of coil 13 a discrete area or spot of track 11 is magnetized and also a flux field is radiated toward, and is picked up by the playback heads 14 and 15. Both heads link substantially equal numbers of lines of said flux field and substantially equal but opposing voltages are generated in coil 16. These voltages, of course, being opposed, cancel one another. At the same time playback head 14 may cut the lines of flux associated with a previously magnetized spot on track 11 in which case, a further voltage is generated in coil 16. The magnetic spot, however, does not affect head 15 as the latter is offset laterally from track 11, and said voltage is not opposed but rather is transmitted to playback circuit 18 to control the latter.

Figure 4:
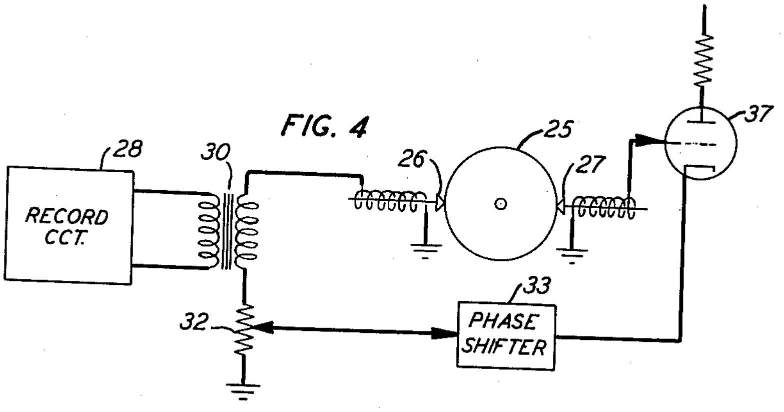

Referring now to Fig. 4 there is shown a disc or drum 25 having associated therewith a record head 26 and a playback head 27. Record head 26 is driven by a record circuit 28 which includes amplifiers and an output transformer 30 between the secondary of which, and ground, the coil for record head 26 is connected in series. Playback head 27 has associated therewith a playback unit which includes an amplifier tube 37 whose grid is connected to the coil of said head. A potentiometer 32 is connected to ground in series with the secondary of the transformer 30 of the recording amplifier, and its tap is connected to an adjustable phase shift network 33 which may be of any suitable type having a D. C. path. For example, the phase shift network illustrated in Fig. 4.1 (A) on page 27 of the text "Electronic Circuits and Tubes" by the Electronics Training Staff of the Cruft Laboratory, Harvard University, published by The McGraw-Hill Book Company, Inc., 1947. The output of phase shifter 33 is applied to the cathode of playback amplifier 37. It is to be mentioned that potentiometer 32 and phase shifter 33 may be replaced by any arrangement adapted to apply to tube 31 a bias voltage which is correctly proportioned to the current in the secondary of transformer 30, and which is phased correctly to cancel the effect on said tube of the flux field radiated from the recording head as a result of said current flowing in the coil thereof. The operation of the device is as follows.

On an operation of record circuit 28, record head 26 magnetizes a discrete spot on the periphery of drum 25 and also radiates a flux field which links the playback head 27. However, through potentiometer 32 and phase shifter 33 a voltage proportional to the current in the coil of the recording head and correctly phased is applied to the cathode of playback amplifier 31 in such manner as to buck the signal applied to the grid of the tube due to the radiated flux field. By adjusting potentiometer 32 and phase shifter 33, the effect of the radiated flux field can be eliminated. However, if at the same time playback head 27 links the flux lines associated with a magnetized spot of drum 25 the resultant voltage signal is amplified by said tube.

It will be seen, therefore, that there have been provided two extremely simple and efficient arrangements for eliminating the effect of radiated flux in magnetic recording systems wherein recording and playback occur simultaneously, both systems being equally well adapted to continuous or audio type recording systems as well as to the spot recording system described.

While there have been above described a limited number of the embodiments of the invention, it is to be understood that many modifications can be made therein without departing from the spirit of the invention and it is not desired, therefore, to limit the invention other than as pointed out in the appended claim or as dictated by the prior art.

I claim:

In a magnetic recording system wherein recording and playing back are conducted simultaneously, the combination of a recording head, a moving member having a recording track spot magnetized by said recording head, a playback head for scanning said track for spot magnetizations, a record circuit for driving said record head, including an amplifier, a playback circuit driven by said playback head, including an amplifier, a potentiometer connected to have applied to its tap a desired percentage of the output of the first said amplifier, and a phase shift network connected to said tap and to the second said amplifier to bias the latter, the potentiometer and the phase shift network being adjusted to overcome, by said bias, the effect on the playback amplifier of a flux field radiated by the record head and cut by the playback head.

References Cited in the file of this patent

UNITED STATES PATENTS

| | | |
|---|---|---|
| 2,257,187 | Owen | Sept. 30, 1941 |
| 2,294,627 | Parr | Sept. 1, 1942 |
| 2,296,754 | Wolf et al. | Sept. 22, 1942 |
| 2,304,738 | McCarty | Dec. 8, 1942 |
| 2,351,008 | Camras | June 13, 1944 |
| 2,438,217 | Johnson | Mar. 23, 1948 |
| 2,456,401 | Gilmore | Dec. 14, 1948 |
| 2,540,654 | Gohen et al. | Feb. 6, 1951 |

FOREIGN PATENTS

| | | |
|---|---|---|
| 457,282 | Germany | Mar. 13, 1928 |